(12) United States Patent
DeCato et al.

(10) Patent No.: US 6,451,870 B1
(45) Date of Patent: Sep. 17, 2002

(54) DUAL CURING SILICONE COMPOSITIONS

(75) Inventors: Alfred A. DeCato, Bellinzago Novarese (IT); Hsien-Kun Chu, Wethersfield, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/719,172

(22) PCT Filed: Jun. 24, 1999

(86) PCT No.: PCT/US99/14485

§ 371 (c)(1),
(2), (4) Date: Dec. 14, 2001

(87) PCT Pub. No.: WO99/67318

PCT Pub. Date: Dec. 29, 1999

Related U.S. Application Data

(60) Provisional application No. 60/090,403, filed on Jun. 24, 1998.

(51) Int. Cl.⁷ ................................................ C08G 77/20
(52) U.S. Cl. ........................... 522/99; 528/17; 528/18; 528/32; 522/33; 522/44; 522/46; 522/40; 522/41; 522/65; 522/60
(58) Field of Search ................................ 528/32, 17, 18; 522/99, 33, 44, 46, 40, 41, 65, 60

(56) References Cited

U.S. PATENT DOCUMENTS

| 4,528,081 A | 7/1985 | Lien et al. | 204/159.13 |
| 4,587,173 A | 5/1986 | Lat et al. | 428/457 |
| 4,603,168 A | 7/1986 | Sasaki et al. | 522/18 |
| 4,699,802 A | 10/1987 | Nakos et al. | 427/54.1 |
| 5,179,134 A | 1/1993 | Chu et al. | 522/37 |
| 5,212,211 A | 5/1993 | Welch, II et al. | 522/37 |
| 5,348,986 A | 9/1994 | Chu et al. | 522/37 |
| 5,498,642 A | 3/1996 | Chu et al. | 522/99 |
| 5,516,812 A | 5/1996 | Chu et al. | 522/20 |
| 6,323,253 B1 * | 11/2001 | Bennington | 522/16 |

\* cited by examiner

*Primary Examiner*—Margaret G. Moore
(74) *Attorney, Agent, or Firm*—Steven C. Bauman

(57) ABSTRACT

The present invention relates to dual curing silicone compositions which are capable of cross-linking when subjected to ultraviolet ("UV") or visible ("VIS") light and/or by a moisture condensation method. When cured, these compositions have excellent adhesion to a variety of substrates. These are particularly useful in potting and coating applications.

23 Claims, No Drawings

DUAL CURING SILICONE COMPOSITIONS

This application claim the benefit of provisional application No. 60/090,403 filed Jun. 24, 1998.

FIELD OF INVENTION

The present invention relates to dual curing silicone compositions which are capable of cross-linking when subjected to radiation in the ultraviolet ("UV") or visible ("VIS") regions of the electromagnetic spectrum, and/or by a moisture condensation method. When cured, these compositions have excellent adhesion to a variety of substrates. They are particularly useful in potting and coating applications.

BRIEF DESCRIPTION OF THE RELATED TECHNOLOGY

Silicone rubber and liquid compositions exist in various forms and their characteristics may be modified to impart specific characteristics such as cure chemistry, viscosity, polymer type and purity. They can be formulated into one-part or two-part systems and a particular silicone composition can be engineered to be cured by more than one mechanism. Moisture-curing mechanisms, heat-curing mechanisms, and photoinitiated curing mechanisms are among those mechanisms used to initiate cure, i.e., cross-linking of reactive silicones. These mechanisms are based on either condensation reactions, whereby moisture hydrolyzes certain groups on the silicone backbone, or addition reactions which can be initiated by a form of energy, such as electromagnetic radiation or heat. For example, reactive polyorganosiloxanes can be cured by heat in the presence of a peroxide, or they can be cured by heat in the presence of a silicon hydride-containing (SiH) compound and a metallic hydrosilylation catalyst, such as an organo-platinum catalyst.

Typically, moisture curable materials are manufactured by endcapping α,ω-silanol terminated silicones with various crosslinkers such as alkoxysilanes, oximinosilanes, acetoxysilanes, aminosilanes, and other silanes with hydrolyzable groups attached to the silicon atom(s) thereof. The resulting silicone materials are stored in moisture impermeable containers.

During application to a respective substrate, the materials are extruded or otherwise applied and exposed to ambient conditions for curing. The moisture in the air then will hydrolyze the hydrolyzable groups (such as alkoxy, oximino, acetoxy, and amino) on the silicon atom(s) to form silanol, either with or without inclusion of a catalyst. The resulting silanol can then further react with remaining unhydrolyzed groups in a condensation reaction, to form a siloxane linkage resulting in the cure of the silicone material.

Although these materials when cured are very reliable and possess superior properties as coatings, the moisture cure tends to be slow. Cure times of 24 hours or more may often be needed before a full cure can be achieved. Such cure times limit through-put in the manufacture of coated components, since full cure of the coated components is needed before the components can be used in the next step of the manufacture process.

As a result, a third curing mode, ultraviolet light curing, has gained wide acceptance in recent years. The curing is relatively fast, with the cured elastomer showing good adhesion to the substrates. In situations where portions of the coated material are shaded during the UV cure, a secondary cure mode, usually moisture cure can be further incorporated.

Typically, UV cure of silicone compositions can be achieved by either a thiol-ene cure or by an acrylate cure. In the thiol-ene cure, a thiol functional silicone is reacted with a vinyl functional silicone. The cure is fast and the surface dry to the touch upon the completion of the cure. However, it has been reported that in commercial applications the cured product does not heat age well, and the uncured composition tends to lack long-term storage stability.

On the other hand, acrylate functional silicone is usually storage stable and the cured products exhibit excellent high temperature resistance. However, with an acrylate cure in the presence of atmospheric oxygen, the surface cure tends to be incomplete and the cured product often times tends to be tacky.

Dual-curing silicone compositions using UV light and moisture curing mechanisms are disclosed in U.S. Pat. No. 4,528,081 (Lien) and U.S. Pat. No. 4,699,802 (Nakos). These patents disclose compositions particularly useful for conformal coatings in electronic applications where the substrate has shadow areas which are not readily accessible to direct UV light and require moisture cure for cross-linking of those areas. Ordinarily, in addition to the photoinitiator present for radiation polymerization, a moisture curing catalyst such as an organotitanate or organotin is present. Without the moisture curing catalyst, moisture cure does not ordinarily take place with any degree of certainty or in any predictable time frame. Thus, as a practical matter, without the moisture curing catalyst, the moisture curing aspect of these compositions would not be practical for commercial use.

U.S. Pat. No. 4,587,173 (Eckberg) discloses dual curing silicone compositions using heat and UV light as separate cross-linking mechanisms. This patent discloses a reactive polyorganosiloxane which requires direct silicon-bonded hydrogen atoms and direct silicon-bonded alkenyl radicals on the same or different polysiloxane chains. These compositions also contain a photoinitiator and a precious metal/hydrosilation catalyst. The presence of the photoinitiator allows cross-linking of the silicon-bonded hydrogen atoms and silicon-bonded alkenyl radicals. These compositions are said to be able to cross-link at room temperature or at elevated temperatures by the precious metal catalysis of the silicon-bonded hydrogen atoms and silicon-bonded alkenyl radicals. Platinum is among the catalysts used for the thermal hydrosilation cure reaction. Moreover, this patent requires a peroxide, which can decompose over time even at room temperature and thereby limit shelf-life.

U.S. Pat. No. 4,603,168 (Sasaki) discloses a method of curing organopolysiloxane compositions, which requires the use of heat in combination with ultraviolet radiation. These compositions contain an organopolysiloxane having per molecule at least two alkenyl groups bonded directly to the silicone atom. Other organic groups may also be present, such as alkyl groups, halogenated alkyl groups, aryl groups, aralkyl groups, and alkaryl groups on the organopolysiloxane backbone. In addition, an organohydrogenpolysiloxane containing at least two organohydrogensiloxane or hydrogensiloxane units per molecule, a platinum catalyst, an addition-reaction retarder and a photoinitiator are also disclosed. The alkenyl groups must be bonded directly to the silicone atom without an organo group therebetween. Both the '173 and '168 patents are also limited to very thin coatings.

Dual-curing compositions employing UV- and moisture-cure mechanisms have a basic disadvantage in that once exposed to ambient moisture, they begin to cure. In many cases, this results in premature curing and shortened shelf life, as well as pot life in use. The advantage of the moisture cure mechanism is that it provides a means to cure shadow areas blocked from UV light. This is particularly important when high temperature curing is not an acceptable commercial option due, for instance, to the heat sensitivity of the substrate to which the reactive silicone is applied. For example, in conformal coatings where the substrate is an electronic circuit board, high temperature curing systems such as those which use peroxides, are not practical. Conventionally, moisture, UV, heat or combinations thereof have been employed as curing mechanisms for such applications.

More recently, as disclosed in the '173 and '68 patents discussed above, heat and UV curing mechanisms have been combined. While these patents disclose compositions which may be useful for heat sensitive substrates due to the combination of UV and low temperature heat cure, each requires a specific type of organopolysiloxane. In the '173 patent, the polyorganosiloxane backbone contains both a hydrogen atom bonded to a silicon atom in the backbone, as well as an olefinic group bonded to a silicon atom. In the '168 patent, the polyorganosiloxane contains an alkenyl group bonded directly to a silicone atom.

U.S. Pat. No. 5,179,134 (Chu) and U.S. Pat. No. 5,212,211 (Welch, II) describe acryloxy functional capped silicones. The silicones of the '134 patent cure only through a photoinitiated mechanism, whereas the silicones of the '211 patent cure through such a mechanism, as well as through a second mechanism, such as moisture or heat, by virtue of additional functional groups attached to the siloxane backbone.

U.S. Pat. No. 5,498,642 (Chu) discloses a dual curing silicone composition, which uses a vinyl dialkoxysilyl-terminated polydimethylsiloxane polymer to provide both UV and moisture curing. This polymer provides better surface skinning during UV exposure, largely due to the presence of the vinyl group, which serves to help eliminate tackiness. Further curing of the composition beneath the UV-formed skin occurs over time through a moisture curing mechanism.

U.S. Pat. No. 5,516,812 (Chu) also discloses a radiation and moisture-curable silicone composition. This composition also employs a silicone endcapped with vinyl functionality in combination with a second silicone fluid having radiation and moisture curable groups present. This composition is specifically designed for conformal coating compositions having improved surface tack.

Notwithstanding the state-of-the-art, it would be desirable to provide a dual UV-curable, moisture-curable silicone composition where cure of the composition by UV results in a coating that is dry to the touch without the common tacky surface often associated with an acrylate cure. It would also be desirable to provide such compositions having at least two different siloxanes, one of which has the ability to photocure and the other of which has the ability to both photocure and cure through exposure to moisture.

SUMMARY OF THE INVENTION

The present invention provides compositions which cure through a photo-initiated mechanism and a dual photo-initiated moisture-curing mechanism. That is, at least two different functionally-terminated polyorganosiloxanes are present in the inventive composition. In a particularly desirable aspect of the present invention, three of such different functionally terminated polyorganosiloxanes are present.

These compositions are specifically designed to be curable by exposure to actinic radiation and/or moisture.

In one aspect, the invention provides a radiation and moisture-curable silicone composition that includes:
(A) a silicone fluid comprised of a monovalent ethylenically unsaturated functional group capped silicone capable of UV and moisture curing:
(B) a (meth)acryloxy-functional capped silicone fluid capable of UV curing, wherein the (meth)acryloxy-functional capped silicone fluid is formed as a reaction product of: (i) a silyl di(meth)acrylate compound of the formula:

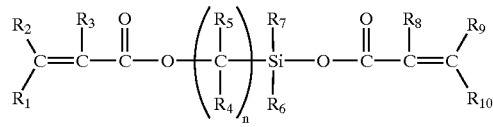

wherein $R^1$, $R^2$, $R^3$, $R^4$, $R^5$, $R^6$, $R^7$, $R^8$, $R^9$ and $R^{10}$ are independently selected from the group consisting of hydrogen, halo, and organo radicals; and n is an integer having a value of from 1 to 4; and (ii) a silicone having at least one functionality which is reactive with a (meth) acryloxy functionality of said silyl di(meth)acrylate compound to yield said (meth)acryloxy-functional capped silicone;
(C) a photoinitiator effective for radiation curing of the silicone composition; and
(D) a moisture curing catalyst.

The capped silicone of (A) is the product of a reaction between a silanol-terminated silicone and a silane having a monovalent ethylenically unsaturated functional group and at least 2 hydrolyzable groups. The (meth)acryloxy-functional capped silicone of (B) is the product of a reaction between a silanol-terminated silicone and a silane having a (meth)acrylate and at least 2 hydrolyzable groups.

In the particularly desirable aspect noted above, the present invention provides compositions that include the silicones of (A) and (B), as well as a third silicone (E), which includes at least one (meth)acryloxydimethoxyalkyl-terminated polyorganosiloxane.

In another aspect, the present invention provides compositions that include:
(i) a first silicone which is capped with vinyl functionality and is the reaction product of a silanol-terminated silicone having at least 60 mole percent Si—OH terminated groups, and has a viscosity at room temperature of greater than 1,000 cps, desirably 1,500–10,000 cps, and a silane having at least one vinyl group and at least two hydrolyzable functional groups [such as the silane having a monovalent ethylenically unsaturated functional group and at least 2 hydrolyzable groups described for silicone (A)];
(ii) a second silicone fluid having radiation-curable (meth) acryl functional groups as described above; and
(iii) an effective amount of a photoinitiator.

These compositions may also include a moisture cure catalyst.

The inventive compositions are particularly advantageous when used in potting applications, or as coatings for electronic applications, particularly those which are temperature sensitive.

The present invention provides an improvement over known dual cure silicone compositions, which depend primarily on siloxanes having the UV and moisture cure capabilities on the same polyorganosiloxane for cure, by providing compositions that include separate polyorganosiloxanes, a first of which depends primarily on vinyl groups for photocure and moisture, and a second of which depends on both (meth)acrylate photocuring groups for photocure. By providing separate polyorganosiloxanes in this manner, the composition can be tailored for specific desired characteristics by balancing the proportions of one polyorganosiloxane with respect to the other polyorganosiloxane. The present invention allows for enhanced UV cure capability, particularly at the surface, in a relatively short time frame, as well as completeness of cure—or cure through volume—by virtue of the moisture cure mechanism and/or the UV cure mechanism.

The inventive compositions once cured provide cured elastomers having improved adhesion to a variety of substrates and by-products which are non-corrosive.

Moreover, the present invention does not suffer from the limitation of being for use as thin coatings, as described by the '173 and '168 patents previously discussed, and either cure mechanism can be used to cure a range of thicknesses, for example, up to 50 mm or more. Certain of the benefits and advantages of the present invention are believed to be attributed to the specific combination of siloxanes and photoinitiators and moisture cure catalysts, which will become more readily apparent from a reading of the sections entitled "Detailed Description of the Invention" and "Examples", which follow.

DETAILED DESCRIPTION OF THE INVENTION

The ethylenically unsaturated functional group capped silicone (A) used in the inventive compositions is formed as the reaction product of a silanol terminated silicone and a silane having a monovalent ethylenically unsaturated functional group and at least two hydrolyzable groups. These silicones are disclosed in U.S. Pat. No. 5,498,642 (Chu), the disclosure of which is hereby expressly incorporated herein by reference.

The silanol terminated silicone used to make silicone (A) should include a linear polydiorganosiloxane having a viscosity as measured on a Brooksfield viscometer at ambient temperature (about 25° C.) of more than 1,000 centipoise ("cps"), desirably between 2,000 and 10,000 cps, such as between 2,000 and 5,000 cps.

This silicone is ordinarily a predominantly linear structure in character, having the silanol (—SiOH) functionality located at the terminus of a polysiloxy [—(SiO)$_x$—] moiety in the silicone molecule.

The silane which reacts with the silanol capped silicone may be described with reference to the formula: $R_aSiX_b$, where each R is independently selected from monovalent ethylenically unsaturated radicals, hydrogen, $C_{1-8}$ alkyl, $C_{6-12}$ aryl, $C_{7-18}$ arylalkyl, $C_{7-18}$ alkylaryl, and X; X is a monovalent functionality imparting moisture curability to the reaction product of the silanol-functionalized silicone and silane crosslinker; a has a value of 1 or 2; b has a value of 2 or 3; and a+b=4, provided that when a is 1, R is a monovalent ethylenically unsaturated radical, and that when a is 2, at least one R is a monovalent ethylenically unsaturated radical.

Thus, R may be a monovalent ethylenically unsaturated radical for example, selected from the group consisting of vinyl, propenyl, butenyl, pentenyl, hexenyl, octenyl, allyl, alkenyloxy, alkenylamino, allyloxy, allylamino, furanyl, phenyl and benzyl groups. Examples include vinyltrimethoxysilane, vinyltriminosilane, vinyltriisopropenyloxysilane and vinyltriacetoxysilane.

The monovalent ethylenically unsaturated functional group capped silicone (A) may be present in amounts of about 5 to about 60% by weight, desirably in amounts of about 15 to about 40% and more desirably about 20 to about 35% by weight. This component provides UV surface curing and moisture curing throughout the thickness of the inventive composition.

The (meth)acryloxy-functional capped silicones (B) of the present invention are formed as a reaction product of a silanol terminated silicone and a silane having a (meth) acrylate and at least two hydrolyzable groups. These (meth) acryloxy-functional capped silicones are set forth in detail in U.S. Pat. No. 5,212,211 (Welch, II), the disclosure of which is hereby expressly incorporated herein by reference.

The acryloxy-functional capped silicone fluid (B) is formed as a reaction product of:
(i) a silyl di(meth)acrylate compound of the formula:

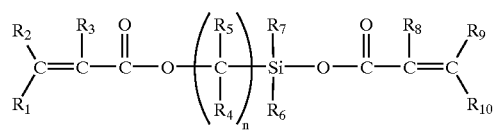

wherein $R^1$, $R^2$, $R^3$, $R^4$, $R^5$, $R^6$, $R^7$, $R^8$, $R^9$ and $R^{10}$ are independently selected from the group consisting of hydrogen, halo, and organo radicals; and n is an integer having a value of from 1 to 4; and (ii) a silicone having at least one functionality which is reactive with a (meth)acryloxy functionality of said silyl di(meth)acrylate compound to yield said (meth) acryloxy-functional capped silicone. This silicone reactive with the silyl di(meth)acrylate may impart a curing mechanism other than photocuring. Desirably, this silicone imparts moisture curing due to the presence of one or more of the following moieties which can undergo hydrolysis and which are selected from the group consisting of hydroxyl, enoloxy, amino, alkoxy, aryloxy, oxime, N,N-dialkylamino, N, N-dialkylaminoxy, N-alkylamido, O—C(CH$_3$)=CH$_2$,—S—C$_3$H$_6$Si(OCH$_3$)$_3$,—O—NH—C—(O)—H and combinations thereof.

The (meth)acryloxy-functional capped silicone (B) may be present in amounts of about 5 to about 90% by weight, desirably about 30 to about 70% and more desirably about 40 to about 60% by weight. This component provides UV curing throughout the thickness of the inventive composition.

The (meth)acryloxyalkyldialkoxy-terminated polyorganosiloxanes (E) that may be included in certain aspects of the present invention include at least one terminal alkoxy group, and desirably two reactive functional groups. Such a material is a product of the reaction of an organopolysiloxane, having at least one end (and desirably both ends) terminated with a silanol group, with a silane containing at least two (and desirably three) alkoxy groups. The number and type of functional group(s) present can be varied according to the desired properties of the final silicone composition. Due to the presence of these functional groups on (E) and the presence of silicones (A) and (B) referred to above, these compositions can be initially cured on a surface by exposure to actinic radiation through a photoinitiated mechanism to thicknesses considerably greater than compositions known heretofore, and more fully cured at ambient temperature in the presence of moisture.

For purposes of this invention, the term "actinic radiation" is meant to include particle or wave electromagnetic radiation and photochemical radiation.

The ability to cure tack free through a photo-induced mechanism through a variety of thicknesses, for example, from about 0.1 mm up to about 50 mm, allows for a variety of potting and/or coating applications heretofore not permitted by other potting compositions using UV curing mechanisms. For example, the '178 patent either does not cure or only partially cures at thicknesses of 8 mm. (See Table 1, col. 10.) Moreover, the '168 patent uses one gram per square meter of this composition as a coating, presumably due to the inability to or difficulties in cure at greater thicknesses. Thus, the advantages obtained by the specific functional groups on the polyorganosiloxane backbone of the present invention are readily apparent. In addition, as noted herein, the use of moisture cure catalysts, such as titanates, which do not absorb appreciable amounts of actinic radiation provide the ability to cure to greater thicknesses as the moisture cure catalyst used in the present invention does not compromise the ability of the composition to cure under exposure to such radiation.

The (meth)acryloxyalkyl-terminated polyorganosiloxane (E) desirably should be in accordance with formula I below:

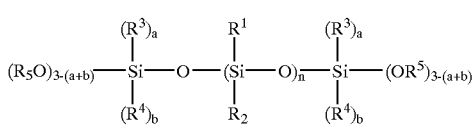

I wherein $R^1$, $R^2$, $R^3$ and $R^4$ may be the same or different and are monovalent hydrocarbon radicals having up to 10 carbon atoms ($C_{1-10}$) or halo or cyano substituted hydrocarbon radicals; $R^3$ may also be a monovalent heterohydrocarbon radical having up to 10 carbon atoms ($C_{1-10}$) where the hereto atoms are selected from halo atoms, O, N, and S; $R^5$ is alkyl ($C_{1-10}$), such as methyl, ethyl or isopropyl; provided that at least one $R^3$ or a terminal end is a (meth) acryloxyalkyl group; $R^5$ may also include an ether linkage, such as $CH_2CH_2OCH_3$; n is an integer; a is 0, 1 or 2; b is 0, 1 or 2; and a+b is 1 or 2.

The number of repeating units in the reactive polyorganosiloxanes can be varied to achieve specific molecular weights, viscosities and other chemical or physical properties. Generally n is an integer such that the viscosity is from about 25 cps to about 2,500,000 cps at 25° C., such as when n is from 1 to 1,200 and desirably from 10 to 1,000.

Component (E) may be present in amounts sufficient to provide enhanced UV and moisture curing capability. Desirably (E) is included in amounts of about 5 to about 70% by weight and more desirably about 5 to 25% by weight.

A particularly desirable silicone fluid for (E) has the following formula II where $R^3$ on formula I is a methacrylate-propyl group, $CH_2C(CH_3)$—$COOC_3H_6$, $R^4$ and $R^5$ on formula I are methyl, and $R^1$ and $R^2$ are as described in formula I above to give:

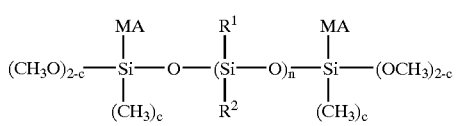

II where MA is the methacryloxypropyl group, n is from 1 to 1,200, a is 1 and c is 0 or 1.

The functional terminated polyorganosiloxanes of the present invention may be present in combined amounts of about 5 to about 95%, such as about 30 to about 70% by weight, desirably about 40 to about 60% by weight.

Due to the presence of both alkoxy and vinyl groups, and desirably alkoxy, vinyl and acrylate groups, these compositions are capable of curing by both moisture and photo curing mechanisms. Thus, for example, the inventive compositions can be subjected to UV light in the presence of a photoinitiator to partially cure or gel the material, which can then be allowed to cure further by moisture in ambient conditions.

The number of repeating units in the polyorganosiloxanes can be varied to achieve specific molecular weights, viscosities and other chemical or physical properties. Generally, n is an integer such that the viscosity is from about 25 cps to about 2,500,000 cps at 25° C., such as when n is from 1 to 1,200 and desirably from 10 to 1,000.

The photoinitiators useful in the present invention may be selected from any known free radical type photoinitiator effective for promoting crosslinking reactions. For example, suitable photoinitiators include UV initiators such as benzophenone and substituted benzophenones, acetophenone and substituted acetophenones, benzoin and its alkylesters, xanthone and substituted xanthones. Desirable photoinitiators include diethoxyacetophenone (DEAP), benzoin methyl ether, benzoin ethyl ether, benzoin isopropyl ether, diethoxyxanthone, chloro-thioxanthone, azobisisobutyronitrile, N-methyl diethanolaminebenzophenone, and combinations thereof.

Visible light photoinitiators include camphoquinone peroxyester initiators, non-fluorene carboxylic acid peroxyester initiators and alkyl thioxanthones, such as isopropyl thioxanthone.

While the photoinitiator may be present in any effective amount, desirable ranges include about 1 to about 10% by weight, such as about 2 to about 6% by weight. A particularly desirable photoinitiator is DEAP.

The compositions also include moisture curing catalysts to enhance the rate at which the hydrolyzable groups on the polyorganosiloxane react with moisture to cure. Such hydrolyzable groups include amino, oxime, acetoxy, alkoxy, aryloxy, alkaryloxy, aryalkoxy and the like. Where the hydrolyzable groups are amino, oxime or acetoxy, however, moisture cure may occur fast enough such that a moisture catalyst may not be necessary.

The moisture curing catalysts include organo-metal catalysts including titanates such as tetraisopropylorthotitanate and tetrabutoxyorthotitanate, as w ell a s metal carboxylates such as dibutyltin dilaurate, dibutyltin dioctoate and the like.

The moisture cure catalyst should be used in an amount sufficient to effectuate moisture cure, which desirably is in the range of about 0.1 to about 5% by weight.

Useful UV radiation sources include conventional mercury-vapor lamps designed to emit ultraviolet energy in various ultraviolet wavelength bands. For example, useful radiation wavelength ranges include 220 to 400 nm.

It should be understood that while the photoinitiator is generally used as a separate component, the formulations used in the inventive composition are intended to include those in which photoinitiating groups are included in the backbone of the same organopolysiloxane polymer which includes the photocuring groups.

The inventive compositions may also contain other additives so long as they do not interfere with the curing mechanisms. For example, conventional additives such as fillers, adhesion promoters, pigments, moisture scavengers, inhibitors and the like may be included.

Fillers such as fumed silica or quartz are contemplated, as are moisture scavengers such as methyltrimethoxysilane and vinyl trimethoxysilane. Fillers may be present in amounts up to about 30% by weight, such as about 4 to about 20% by weight.

Inhibitors may be present up to about 10% by weight, desirably about 0.5 to about 1% by weight. The particular amount of inhibitor should be balanced in a given composition to produce or improve stability of the composition.

Adhesion promoters may be present in amounts of up to about 5%, such as about 2% by weight.

UV cure is generally effected in the range of 40 milliwatts/cm$^2$ ("mW/cm$^2$") to about 300 mW/cm$^2$, such as in the range of about 70 mW/cm$^2$ to about 150 mW/cm$^2$.

As an alternative aspect of the invention, heat curing may be used to cure the compositions, provided a heat cure catalyst, such as platinum, is used, and at least one of the polyorganosiloxanes includes a hydride terminal group available for condensation with the ethyleneically unsaturated group on another of the polyorganosiloxanes. For example, room temperature cure is contemplated, as well as temperatures up to about 150° C., such as in the range of from about 65° C. to about 125° C. and desirably in the range of from about 85° C. to about 100° C. Although heat curing can be effected at higher temperatures than these given, the recited temperatures allow for use of the compositions in applications, such as potting applications and coatings for electronic applications, which are temperature sensitive.

The compositions of the present invention may be prepared by mixing together the respective components to obtain a substantially homogenous or uniformly blended material and stored in containers which are non-transmissive to UV light and moisture. Generally, a single package system is employed, but two-part package systems may be used if desired. Whereas single package products are ready-for-use upon being dispersed, two-part systems require mixing of the dispersed parts prior to use.

The inventive compositions may be used as noted above in potting applications and coatings for a variety of substrates including electronic parts and other heat-sensitive materials.

The following examples are provided for illustrative purposes only, and are in no way intended to limit the scope of the present invention.

EXAMPLES

In these examples, percent weights are per the total composition unless otherwise specified.

The vinyldimethoxy-terminated polydimethylsiloxane polymers used in the present invention were made in accordance with the teachings of U.S. Pat. No. 5,498,642. Accordingly, two hundred fifty seven grams of the 3,500 cps silicone fluid was allowed to react with 3.0 grams of vinyltrimethoxysilane in the presence of 0.2 ml of butyl-lithium (1.6 M) in a reaction vessel with nitrogen sparge for 90 minutes and then sparged with carbon dioxide for 30 minutes to obtain a vinyldimethoxysilyl-terminated silicone fluid.

The acryloxymethyldimethylsilyl-terminated polydimethylsiloxane polymers used in the present invention were made with the teachings of U.S. Pat. No. 5,212,211. Accordingly, 2 moles (about 500 grams) of acryloxymethyldimethylacryloxysiloxane was reacted with 12 kg of 750 cps (m.w. 12,000) silanol fluid at room temperature, followed by stripping to remove the acrylic and by-product. The resultant polymer was acryloxymethyldimethylsilyl-terminated polydimethylsiloxane.

The methacryloxyalkyldimethoxy-terminated polydimethylsiloxane polymers used in the present invention were made in accordance with the teachings of U.S. Pat. No. 5,300,608. Accordingly, 500 grams of a 2,000 cps (spindle #4) silanol-terminated polydimethylsiloxane fluid was placed in a reaction vessel. Fourteen grams of methacryloxypropyltrimethoxysilane was then added. To this mixture, with stirring, was further added 0.65 grams of lithium n-butyldimethylsilanolate solution previously prepared. The mixture was stirred at room temperature under nitrogen for 3 hours. The temperature of the mixture rose to 50° C. due to shearing. A gentle stream of carbon dioxide was bubbled into the system for 10 minutes for catalyst quenching. The mixture was then heated to 110° C. under nitrogen sparge for 30 minutes to remove volatile materials. At room temperature, the mixture showed a viscosity reading of 3,100 cps (Brookfield Viscometer, spindle #4 at 10 rpm).

Table I represents compositions in accordance with the present invention which contain three reactive silicone polymers as well as the photoinitiator, moisture cure catalyst and other useful additives. The desired ranges of the components are provided.

TABLE I

| Component | Range (Wt %) |
| --- | --- |
| Vinyldimethoxy-terminated polydimethylsiloxane (m.w. 28,000) | 18–32 |
| Acryloxymethyldimethysilyl-terminated polydimethylsiloxane (m.w. 12,000) | 25–55 |
| Methacryloxyalkyldimethoxy-terminated polydimethylsiloxane (m.w. 20,000) | 5–60 |
| Fumed silica (filler) | 4.2–4.7 |
| Photoinitiator | 2.4–3.6 |
| Moisture cure catalyst | 0.3–0.5 |
| Monomer diluent | 3.7–6.3 |
| Adhesion promoter | 1.75–4.25 |
| Vinyl trimethoxysilane (crosslinker) | 2–3 |
| Dye | 0.003–0.008 |

TABLE II

| Component | Composition Wt % | | | | |
| --- | --- | --- | --- | --- | --- |
| | A | B | C | D | E |
| Vinyldimethoxy-terminated polydimethylsiloxane (m.w. 28,000) | 26.0 | 27.6 | 27.6 | 19.63 | 43.3 |
| Acryloxymethyldimethylsilyl-terminated polydimethylsiloxane (m.w. 12,000) | 52.8 | 55.2 | 55.2 | 54.56 | 43.3 |
| Photoinitiator | 2.8 | 2.0 | 2.0 | 3.92 | 2.0 |
| Adhesion promoter | 6.7 | — | — | — | — |
| Monomer diluent | 3.7 | — | 5.0 | 3.92 | |
| Tin carboxylate (moisture catalyst) | 0.2 | 0.2 | 0.2 | 0.3 | 0.2 |
| Plasticizer/Filler | 13.9 | 15 | 10 | 17.66 | 13.2 |

Compositions A–E were tack free after exposure to UV and further moisture curing for a period of 2 hours at room temperature. These compositions, when fully cured after overnight ambient cure showed good adhesion on the following substrates: nylon, polyoxymethylene acetal resin sold under the trademark Delrin, polyetherimide sold under the trademark Ultem; and polyethylene terephthalate sold under the trademark VALOX.

Composition C was also UV cured and ambient cured overnight in sheets of 0.035" thick and subsequently yielded a tensile strength at room temperature of 68 psi, a tensile strength at 50% RH of 18 psi, and an elongation at room temperature of 279%. When Composition C was UV cured and room temperature cured for 7 days in sheets of the same thickness, the following results were obtained: room temperature tensile strengths of 58 psi; a tensile strength of 27 psi at 50% RH; and a room temperature elongation of 145%.

What is claimed is:

1. A radiation and moisture-curable silicone composition, comprising:

(A) a first silicone fluid, said first silicone fluid comprised of a monovalent ethylenically unsaturated functional group endcapped silicone, said endcapped silicone being the product of a reaction between a silanol terminated silicone and a silane crosslinker having joined directly to a silicon atom thereof a monovalent ethylenically unsaturated functional group and at least 2 hydrolyzable groups;

(B) a second silicone fluid, said second silicone fluid comprised of a (meth)acryloxy-functional capped silicone fluid capable of UV curing, said (meth)acryloxy-functional capped silicone fluid being formed as a reaction product of:

(i) a silyl di(meth)acrylate compound of the formula:

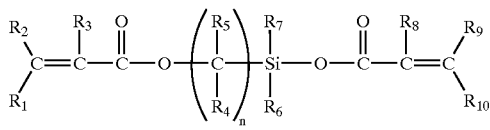

wherein $R^1$, $R^2$, $R^3$, $R^4$, $R^5$, $R^6$, $R^7$, $R^8$, $R^9$ and $R^{10}$ are independently selected from the group consisting of hydrogen, halo, and organo radicals; and n is an integer having a value of from 1 to 4; and (ii) a silicone having at least one functionality which is reactive with a (meth)acryloxy functionality of said silyl di(meth)acrylate compound (C) a photoinitiator component; and (D) a moisture curing catalyst.

2. The composition according to claim 1, wherein (i) said first silicone fluid is endcapped with vinyl functionality and is the reaction product of a silanol-terminated silicone having a viscosity at room temperature of greater than 1,000 cps, and a silane crosslinker having at least one vinyl group and at least two hydrolyzable functional groups; and (ii) said second silicone fluid includes both radiation-curable (meth) acryl functional groups and moisture-curable hydrolyzable groups.

3. The composition according to claim 2, wherein the mole ratio of vinyl functional groups to the (meth)acryl functional groups is from 5:95 to 4:6.

4. The composition according to claim 2, wherein said silane crosslinker is within the formula, $R_aSiX_b$, wherein R is a member selected from the group consisting of monovalent ethylenically unsaturated radicals, hydrogen, $C_{1-8}$ alkyl, $C_{6-12}$ aryl, $C_{7-18}$ arylalkyl, $C_{7-8}$ alkylaryl, and X; X is a monovalent functionality imparting moisture curability to the reaction product of the silanol-functionalized silicone and silane cross-linker, a has a value of 1 or 2; b has a value of 2 or 3; and a+b=4, provided that when a is 1, R is a monovalent ethylenically unsaturated radical, and that when a is 2, at least one R is a monovalent ethylenically unsaturated radical.

5. The composition according to claim 4, wherein R is a monovalent ethylenically unsaturated radical.

6. The composition according to claim 4, wherein R is selected from the group consisting of vinyl, propenyl, butenyl, pentenyl, hexenyl, octenyl, allyl, alkenyloxy, alkenylamino, allyloxy, allylamino, furanyl, phenyl and benzyl groups.

7. The composition according to claim 2, wherein said silane crosslinker is a member selected from the group consisting of vinyltrimethoxysilane, vinyltriaminosilane, vinyltriamidosilane, vinyltrioximinosilane, vinyltris(methyl ethylketoximino)silane, vinyltriisopropenyloxysilane, vinyltriacetoxysilane, and combinations thereof.

8. The composition according to claim 1, further comprising (E) a third silicone fluid, said third silicone fluid comprised of at least one (meth)acryloxyalkyldialkoxy-terminated polyorganosiloxane.

9. The composition according to claim 8, wherein said third silicone fluid (E) is selected from the group consisting of methacryloxypropyldimethoxy-terminated polyorganosiloxane, acryloxypropyldimethoxy-terminated polyorganosiloxane and combinations thereof.

10. The composition according to claim 1, wherein the second silicone fluid is selected from the group consisting of methacryloxypropylsilyl-terminated silicone, acryloxypropylsilyl-terminated silicone and combinations thereof.

11. The composition according to claim 1, for use as a potting composition.

12. The composition according to claim 1, wherein said silicone (ii) reactive with a (meth)acryloxy functionality of said silyl diacrylate compound imparts moisture-curing to said composition.

13. The composition according to claim 12, wherein said moisture-curing is imparted due to the presence of a moiety selected from the group consisting of bydroxyl, enoloxy, amino, alkoxy, aryloxy, oxime, N,N-dialkylamino, N,N-dialkylaminoxy, N-alkylamido, O—C(CH$_3$)=CH$_2$,—S—C$_3$H$_6$Si(OCH$_3$)$_3$,—O—NH—C—(O)—H and combinations thereof.

14. The composition according to claim 1, wherein the (meth) acryloxyalkyldialkoxy-terminated polyorganosiloxane (E) is a product of the reaction of an organopolysiloxane, having at least one end terminated with a silanol group, with a silane containing three alkoxy groups.

15. The composition according to claim 8, wherein the (meth)acryloxyalkyl terminated polyorganosiloxane (E) is in accordance with formula I below:

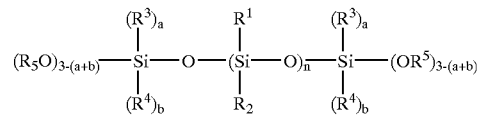

wherein $R^1$, $R^2$, $R^3$, and $R^4$ may be the same or different and are monovalent hydrocarbon radicals having up to 10 carbon atoms ($C_{1-10}$) or halo or cyano substituted hydrocarbon radicals; $R^3$ may also be monovalent heterohydrocarbon radical having up to 10 carbon atoms ($C_{1-10}$) wherein the hereto atoms are selected from halo atoms, O, N, and S; at least one $R^3$ on a terminal end is a (meth)acryloxyalkly group; $R^5$ is alkyl ($C_{1-10}$) or alkoxy; n is an integer; a is 0, 1 or 2; b is 0, 1 or 2; and a+b is 1 or 2.

16. The composition according to claim 15, wherein n is from 1 to 1,200 such that the (meth)acryloxyalkyldialkyloxy-terminated polyorganosiloxane (E) has a viscosity from about 25 cps to about 2,500,000 cps at 25° C.

17. The composition according to claim 8, wherein $R^3$ is a methacrylate-propyl group, CH$_2$C(CH$_3$)—COOC$_3$H$_6$, $R^4$ and $R^5$ are methyl, and $R^1$ and $R^2$ are as described in formula I above to give the following formula:

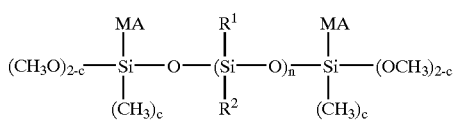

II wherein MA is a methacryloxypropyl group, n is from 1 to 1,200 and c is 0 or 1.

18. The composition according to claim 1, wherein said first silicone fluid is present in amounts of about 5% to about 60% by weight of the composition.

19. The composition according to claim 1, wherein said second silicone fluid is present in amounts of about 5% to about 90% by weight of the composition.

20. The composition according to claim 1, wherein the photoinitiator is a member selected from the group consisting of benzophenone and substituted benzophenones, acetophenone and substituted acetophenones, benzoin and its alkylesters, xanthone and substituted xanthones, and combinations thereof.

21. The composition according to claim 1, wherein the photoinitiator is a member selected from the group consisting of diethoxyacetophenone, benzoin methyl ether, benzoin ethyl ether, benzoin isopropyl ether, diethoxyxanthone, chloro-thioxanthone, azo-bisisobutyronitrile, N-methyl diethanolaminebenzphenone, and combinations thereof.

22. The composition according to claim 1, wherein the photoinitiator is a member selected from the group consisting of camphoroquinone peroxyester initiators, non-fluorene-carboxylic acid peroxyesters and combinations thereof.

23. A method of preparing the composition according to claim 1, the steps of which include mixing said components to provide a blend under a dry air or nitrogen atmosphere.

* * * * *

UNITED STATES PATENT AND TRADEMARK OFFICE
CERTIFICATE OF CORRECTION

PATENT NO.    : 6,451,870 B1
DATED         : September 17, 2002
INVENTOR(S)   : Alfred A. DeCato et al.

It is certified that error appears in the above-identified patent and that said Letters Patent is hereby corrected as shown below:

Column 1,
Line 3, change "claim" to -- claims --

Column 4,
Line 7, change ":" to -- ; --

Signed and Sealed this

Twenty-fifth Day of February, 2003

JAMES E. ROGAN
*Director of the United States Patent and Trademark Office*